3,075,999
GLYCIDYL ESTERS
Ronald K. June, Lafayette, and John C. Rapean, Walnut Creek, Calif., assignors to Shell Oil Company, a corporation of Delaware
No Drawing. Filed Dec. 29, 1958, Ser. No. 783,165
3 Claims. (Cl. 260—348.6)

This invention relates to an improved process for the preparation of glycidyl esters of soap-forming acids such as fatty acids. The present invention is more particularly concerned with the preparation of glycidyl esters of dimer and trimer fatty acids. The process of the present invention may also be employed in the preparation of glycidyl esters of other carboxylic acids. In the past, glycidyl esters of soap-forming acids, such as dimer and trimer fatty acids, have been prepared by first preparing the alkali metal salt of the acid in the presence of a solvent, dehydrating this salt and then reacting the salt with an epoxy halo-subsituted compound having a 1,2-epoxy group, such as epichlorohydrin, in the presence of a suitable catalyst. Unfortunately, the preparation of the intermediate acid salt is excessively slow and unduly difficult because of foaming phenomenon during water evolution. Moreover, caking and stirring complications due to the high viscosity of the soap gel and slow filtration rates in removing any unreacted soap gel from the reaction product further render this prior method altogether undesirable.

It has now been discovered that the shortcomings of this prior two-step process may be altogether avoided by the present simple yet highly efficient one-step process. In essence, this new one-step process differs from the aforementioned process in that it features the direct addition of alkali to a solution of an epoxy halo-substituted compound, such as epichlorohydrin and the appropriate acid and catalyst. The desired glycidyl ester product can then be directly separated from the reaction mixture and worked up by water-washing, stripping and filtering to clarify. Employing this process, the formation in large quantities of soap gel is avoided because the salt resulting from the addition of alkali immediately reacts with the epoxy halo-substituted compound to form the desired glycidyl ester.

Because the present process is particularly concerned with the prevention of soap gel formation in the preparation of glycidyl esters, the preferred acids of the present invention are soap-foaming acids, particularly fatty acids having at least twelve and usually not more than thirty carbon atoms in the monomer such as lauric, palmitic, stearic, nondecylic, arachidic, and the like. The present invention is most particularly concerned with dimers and trimers of these fatty acids.

It will be understood that the process of the present invention may, if desired, be employed using other acids. Thus, the acids may be aliphatic, cycloaliphatic, aromatic or heterocyclic and may be saturated or unsaturated. The acids may also be substituted with non-interferring substituents, such as alkoxy radicals, ester radicals, and the like. Examples of these acids include, among others, butyric acid, propionic acid, valeric acid, caproic acid, caprylic acid, oleic acid, ethacrylic acid, crotonic acid, sorbic acid, linoleic acid, cinnamic acid, phenylacetic acid, methylbenzoic acid, tert-butylbenzoic acid, 1-naphthoic acid, rosin acid, phthalic acid, isophthalic acid, terephthalic acid, adipic acid, succinic acid, pelargonic acid, lauric acid, hendecanoic acid, cyclohexanecarboxylic acid, 3-methylcyclohexanecarboxylic acid, methoxycyclohexanecarboxylic acid, carnaubic acid, melissic acid and behenic acid.

Other acids which may be used in the process are the aliphatic, cycloalphatic and aromatic dicarboxylic acids and monocarboxylic acids containing no more than thirty carbon atoms, such as, for example, acrylic acid, methacrylic acid, benzoic acid, methoxybenzoic acid, toluic acid, and methoxysuccinic acid.

The epoxy halo-substituted compounds used in the process are those having a 1,2-epoxy group, i.e., a

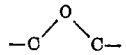

group, which is joined directly to an aliphatic carbon atom bearing a halogen atom. These compounds may be substituted with aliphatic, aromatic, cycloaliphatic or heterocyclic radicals which may be further substituted with non-interfering substituents, such as ester groups, ether radicals, and the like. Examples of the epoxy halo-substituted compounds include, among others, epichlorohydrin, epibromohydrin, epifluorohydrin, 1-chloro-2,3-epoxybutane, 1-chloro - 2,3 - epoxyhexane, 1 - chloro-2,3-epoxy-phenyloctane, 1-chloro-2,3-epoxy-4,5-diethyldodecane, 3-chloro-4,5-epoxyoctane, 4-chloro-5,6-epoxydodecane, 1-chloro-2,3-epoxycyclohexane, 1-chloro-2,3,5,6-diepoxydecane, 1-bromo-2,3-epoxyhexane, 1 - bromo - 2,3-epoxy-5-phenyldodecane and 1-bromo-2,3-epoxy-4-cyclohexyloctane.

Preferred epoxy halo-substituted compounds to be used are those of the general formula

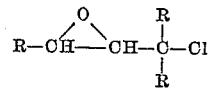

where R is hydrogen or a hydrocarbon radical, and preferably an aliphatic hydrocarbon radical containing from 1 to 10 carbon atoms, such as epichlorohydrin, 1-chloro-2,3-epoxyhexane, 1-chloro-2,3-epoxy - 4 - butyloctane, 1-chloro-2,3-epoxyheptane, 3 - chloro-4,5-epoxydodecane, 3-chloro-4,5-epoxynonane and 1-chloro-2,3-epoxy-4-cyclohexyloctane.

Of special interest, particularly because of the efficiency with which the process may be carried out, are the epoxyalkyl halides and particularly the 1-chloro-2,3-epoxyalkanes, such as epichlorohydrin.

The quaternary salts that may be used as catalysts for the reaction are preferably those of the formula

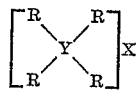

wherein Y is nitrogen, phosphorous or arsenic, X is an ion of an inorganic acid, and R is a hydrocarbon radical, such as an alkyl, cycloalkyl, aryl, alkaryl arylalkyl, and the like, radicals. Examples of these salts include, among others, benzyltrimethylammonium chloride, phenyltributylammonium chloride, cyclohexyltributylammonium sulfate, benzyltrimethylammonium sulfate, benzyltrimethylphosphonium chloride, phenyltrioctylammonium sulfate, phenyltriethylarsonium chloride, tetramethylammonium chloride, tetrabutylammonium sulfate, tetraoctylammonium nitrate, diphenyldimethylammonium borate, diphenyldioctylammonium chloride, benzyltrimethylammonium borate, diphenyldimethylphosphonium chloride, dicyclohexyldiethylarsonium chloride, benzyltrinonylammonium chloride, and benzyltridocecylammonium sulfate.

Particularly preferred quaternary salts to be used in the process are those of the formula

wherein Y is nitrogen, R is an alkyl, aryl or arylalkyl radical, preferably containing no more than 12 carbons, and X is a chlorine or bromine, such as benzyltrimethylammonium chloride, benzyltrimethylammonium bromide, cyclohexyltrimethylammonium bromide, phenyltrioctylammonium chloride, tetrabutylammonium chloride and tetraoctylammonium chloride. Tetramethylammonium bromide is the most preferred quaternary salt catalyst for the purposes of the present invention.

The tertiary amines that may be used as catalysts are those mono- or poly-amines having an open chain or cyclic structure which have all of the amine hydrogen replaced by suitable substituents, such as hydrocarbon radicals, and preferably aliphatic, cycloaliphatic, or aromatic radicals. Examples of these amines include, among others, triethylamine, tributylamine, dimethyl benzylamine, triphenylamine, tricyclohexylamine, pyridine, quinoline, and the like.

Preferred amines are the trialkyl, tricycloalkyl and triaryl amines, such as triethylamines, triphenylamine, tri-(2,3-dimethylcyclohexyl)amine, and the like. Weak tertiary amines, e.g., amines that in aqueous solution give a pH less than 10, are particularly preferred.

The amount of the tertiary amine or quaternary salt to be used in the process may vary over a considerable range. Generally, the amine or salt will be employed in amounts varying from about 0.01% to 5% by weight of the acid reactant. Preferred amounts vary from about .01% to 3% by weight of the acid. The reaction may be conducted, if desired, without the employment of catalyst. The catalyst is employed merely to effect quality improvement in the product.

Alkaline materials which may be employed for the purposes of the present invention are potassium hydroxide, sodium hydroxide, lithium hydroxide, calcium hydroxide and magnesium hydroxide, as well as magnesium oxide and calcium oxide. The potassium hydroxide and sodium hydroxide may be added in the form of pellets or in solution. The magnesium oxide and calcium oxides may, if desired, be added as the dry powder or as slurries. It will be readily understood, however, that the invention is not restricted to these specific alkaline materials but that the invention encompasses the employment of any alkaline material when added to the solution of epoxy halo-substituted compounds, such as epichlorohydrin, containing the appropriate acid and catalyst. Potassium hydroxide has been found most preferable and is considered vastly superior to the aforementioned alkaline compounds because it effects a more fluid reaction system, gives a higher reaction rate and forms a product evidencing superior epoxy values.

The process of the present invention is best illustrated by the following specific examples. It is to be understood, however, that the invention is not limited to the specifically recited conditions or reactions set forth by way of illustration.

In one preparation of diglycidyl esters from dimerized fatty acid in epichlorohydrin 500 g. of dimerized fatty acid (1.692 equivalents), 1567 g. of epichlorohydrin (10×1.692 equivalents), and 2.61 g. of tetramethylammonium bromide catalyst (0.01×1.692 equivalents) were placed in a flask and refluxed at approximately 117° C., the boiling point of epichlorohydrin, with stirring. 1.692 equivalents of 50% potassium hydroxide was added dropwise through a funnel. The addition of potassium hydroxide was adjusted to control the refluxing kettle temperature at 110±1° C. as a water phase was continuously separated and withdrawn from the reflux. The addition rate for this equipment scale was approximately 1 cc. potassium hydroxide per minute. When addition was completed, the temperature was brought to 117° C. by continued water separation overhead. When a temperature of 117° C. was reached, reaction was complete so that further holding time was unnecessary. Most of the water is taken off during the course of the reaction itself. Heating for extended periods of time is unnecessary and appears to degrade the product. The reaction mixture was then cooled to under 30° C. and the salt separated by filtration or worked in accordance with methods known to those versed in the art. In the instant example, the epichlorohydrin and remaining water were distilled from the filtrate under reduced pressure and stabilized at 100° C. (2 mm.) for one hour. A nitrogen purge was used to strip residual epichlorohydrin and eliminate bumping. The cloud was removed from the product by hot filtration through a filter aid. Product yield under these conditions was 97% based on acid and assumed product equivalent weight of 350. The epoxy value was 0.25 equivalent/100 g. and total chlorine content was about 1% by weight.

Alternatively, sufficient water may be charged to dissolve the by-product chloride salt at 40° C. in the case of the dimer product, and the by-product chloride at 50° C. in the case of the trimer product. The brine may then be allowed to settle and drained. The epichlorohydrin may then be stripped off for reuse at 100 mm. pressure and 90° C. Subsequently, if desired, epichlorohydrin by-product contaminant may be taken off at 5 mm. pressure at 130° C. and the product pressured through a filter.

The initial reaction as indicated may be carried on at 117° C. Experiments have shown that, if desired, temperatures above 117° and below 95° C. may be employed. Reactions have been carried out at 70° C. The reaction may be carried out at a temperature of 95° C. to 117° C. at atmospheric pressure or above, and below this range under vacuum or pressure. The preferred temperature for the reaction is 110° C. at atmospheric pressure. Excessively high temperatures have been found to degrade the product.

The equivalent ratios of the epichlorohydrin to acid may vary considerably without departing from the scope of the invention. For example, the equivalent ratio of epichlorohydrin to dimer acid may range from 15:1 to 2:1. The reaction is preferably carried out at a ratio of epichlorohydrin to dimer acid of 10:1.

The time required for the addition of the alkali may also vary considerably. However, it is preferred that the alkali be metered into the reaction autoclave at a controlled rate.

The alkali addition preferably varies from 35–145 minutes. Addition time of 35 minutes is most preferred. Highest product quality was found at about 110° C., a ratio of 10:1 of epichlorohydrin to acid and a 35-minute addition time. An ester made under these conditions from 75% dimer and 25% trimer mixture of fatty acids contained 0.26 equivalent per 100 grams epoxide (91% of theory) and only 0.25% by weight of chlorine.

In another example of the preparation of diglycidyl esters from dimerized fatty acids and epichlorohydrin, 140 pounds fatty acid dimer was dissolved in 438 pounds of epichlorohydrin and 331 grams tetramethylammonium bromide catalyst was added. The mixture was brought to reflux in a 100-gallon autoclave at atmospheric pressure. The water phase was separated from the overhead while a stoichiometric quantity of 50% potassium hydroxide was added uniformly over a 65-minute period. The kettle was maintained at a temperature of 110° C. When addition was complete, a 150-pound portion of the excess epichlorohydrin was distilled off. The remaining slurry was cooled to 40° C. and 104 pounds water charged to dissolve the KCl by-product. After a two-hour settling period, 136 pounds brine was drained from the autoclave. The organic phase was then batch distilled in the autoclave to recover an additional 211 pounds of the excess epichlorohydrin. A total of 170 pounds glycidyl esters, having an epoxide value of 0.238 equivalent/100 g. and an ester value of 0.290 equivalent/100 g., was obtained as filtrate from the kettle residue.

The table below shows properties of products prepared by the present unique one-step process. Data for typical products synthesized by the two-step method are also included for comparison.

| Run | ECH: acid eq. ratio | Reaction temp., °C. | Diglycidyl ester product | |
|---|---|---|---|---|
| | | | Epoxide value, eq./100 g. | Ester value, eq./100 g. |
| 1 | 13:1 | a 112 | 0.246 | 0.291 |
| 2 | 11:1 | 115 | 0.249 | 0.293 |
| 3 | 10:1 | 110 | 0.253 | 0.296 |
| 4 | 5:1 | 109 | 0.227 | 0.305 |
| 5 | 3:1 | 111 | 0.206 | 0.305 |
| 6 | 2:1 | 114 | 0.191 | |
| 7 | 11:1 | 70 | 0.166 | 0.276 |
| 8 b | 10:1 | 110 | 0.241 | 0.309 |
| 9 b | 10:1 | 110 | 0.257 | 0.298 | a Followed by one hour at 117° C.
b Prepared in the laboratory by two-step processes using benzene solvent and a 3-hour reaction period.

It will be apparent that the esters produced by the present one-step method compare favorably with those produced by the prior two-step method yet possess none of the serious shortcomings which have rendered the prior process so undesirable.

We claim as our invention:

1. The process for the preparation of unsubstituted 2,3-epoxyalkyl esters of mixtures of dimer and trimer fatty acids of from 12 to 30 carbon atoms, which comprises contacting such mixtures with an unsubstituted 1-halo-2,3-epoxyalkane of from 3 to 13 carbon atoms, in the presence of a catalyst of the group consisting of unsubstituted trialkyl amines, unsubstituted tricycloalkylamines, unsubstituted triarylamines which in aqueous solution give a pH of less than 10, and quaternary ammonium bromides and chlorides wherein the substitutents on the nitrogen are selected from the group consisting of alkyl hydrocarbon radicals, monocyclic aryl hydrocarbon radicals and monocyclic aralkyl hydrocarbon radicals, of up to 12 carbon atoms, at a temperature of 70° C. to 117° C., while adding thereto at a uniform rate for a period of at least 35 minutes an aqueous solution of an alkaline compound selected from the group consisting of alkali metal and alkaline earth metal oxides and hydroxides.

2. The process of claim 1, wherein the catalyst is tetramethyl ammonium bromide.

3. The process of claim 1, wherein the catalyst is tetramethyl ammonium bromide and the epoxyalkyl halide is epichlorohydrin.

References Cited in the file of this patent

UNITED STATES PATENTS

| 2,537,981 | Edwards | Jan. 16, 1951 |
| 2,761,870 | Payne et al. | Sept. 4, 1956 |
| 2,772,296 | Mueller | Nov. 27, 1956 |

FOREIGN PATENTS

| 557,759 | Canada | May 20, 1958 |